(12) United States Patent
Burgess et al.

(10) Patent No.: US 11,805,124 B2
(45) Date of Patent: Oct. 31, 2023

(54) APPARATUS AND METHODS FOR CONTINUOUS REAL-TIME AUTHENTICATION

(71) Applicant: Bank of America Corporation, Charlotte, NC (US)

(72) Inventors: Patrick Burgess, Stockholm (SE); Trish Gillis, Chicago, IL (US); Taylor Farris, Hoboken, NJ (US); Napangsiri Wanpen, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 335 days.

(21) Appl. No.: 17/407,256

(22) Filed: Aug. 20, 2021

(65) Prior Publication Data

US 2023/0057574 A1  Feb. 23, 2023

(51) Int. Cl.
*H04L 9/40* (2022.01)
*G06N 20/00* (2019.01)

(52) U.S. Cl.
CPC ......... *H04L 63/0861* (2013.01); *G06N 20/00* (2019.01); *H04L 63/102* (2013.01); *H04L 63/20* (2013.01)

(58) Field of Classification Search
None
See application file for complete search history.

(56) References Cited

U.S. PATENT DOCUMENTS

2022/0342972 A1\* 10/2022 Van Os ............... G06V 40/172

\* cited by examiner

*Primary Examiner* — Cai Y Chen
(74) *Attorney, Agent, or Firm* — Weiss & Arons LLP (57) ABSTRACT

Apparatus and methods for continuous real-time authentication are provided. The apparatus and methods may include using a biometric sensor on an Internet-of-things ("IoT") device to measure a biometric attribute of a user. The measured biometric attribute may be transmitted to a server to compare to a stored biometric attribute and authenticate the user. The IoT device may continue to measure the biometric attribute of the user at a pre-determined interval. Each measurement may be used to authenticate the user. This continuous authentication process may take place without the user's conscious interaction with the IoT device. The apparatus and methods may include using the continuous authentication to process and approve a transaction the user requests.

20 Claims, 5 Drawing Sheets

APPARATUS AND METHODS FOR CONTINUOUS REAL-TIME AUTHENTICATION

FIELD OF TECHNOLOGY

Aspects of the disclosure relate to providing apparatus and methods for continuous and real-time authentication of a user.

BACKGROUND OF THE DISCLOSURE

Internet-of-things ("IoT") devices are becoming more powerful and ubiquitous. IoT devices may include various biometric sensors. Users may use IoT devices for various tasks, including transactions and purchases. In order to securely process and complete purchases, transactions, and other tasks, the users should be authenticated.

Currently, a user has to re-authenticate often. For example, the user may have to log in and enter a username, password, PIN, one-time code or other authenticator whenever the user wants to perform certain transactions or other tasks.

This constant requirement to re-authenticate may waste time and require effort on part of the user. Therefore, it would be desirable for apparatus and methods for passive, continuous and real-time authentication of a user utilizing IoT devices and biometric sensors.

SUMMARY OF THE DISCLOSURE

It is an object of this disclosure to provide apparatus and methods for continuous and real-time authentication of a user with IoT devices.

An apparatus for continuous real-time authentication using Internet-of-things ("IoT") devices is provided. The apparatus may include one or more IoT devices and a server. The server may be centralized or distributed.

Each IoT device may include a communication link, a processor, one or more biometric sensors, and a non-transitory memory. The non-transitory memory may be configured to store an operating system for the IoT device, and a monitoring engine.

The monitoring engine may run on the processor. The monitoring engine may be configured to measure one or more biometric attributes of a first user. The measurements may take place at pre-determined time intervals. The monitoring engine may transmit a first measured biometric attribute of the first user to the server. The monitoring engine may receive confirmation that the first user is authenticated from the server. The monitoring engine may monitor the user and wait for a transaction instruction from the first user. The monitoring engine may transmit the first user's transaction instruction to the server along with the confirmation of authentication.

The monitoring engine may receive a confirmation from the server that the transaction requested was completed. The monitoring engine may inform the first user that the transaction was completed.

As the biometric attribute measurements continuously take place at the pre-determined time intervals, the monitoring engine may determine if the first user has been changed to a second user when the first measured biometric attribute changes to a second measured biometric attribute. The monitoring engine may determine the second measured biometric attribute belongs to the second user by comparing it with the first measured biometric attribute. Different measured biometric attributes imply different users.

The monitoring engine may receive a second transaction instruction from the second user. The monitoring engine may ignore the second transaction instruction until the second user is authenticated by the server.

The server may include a communication link, a processor, and a non-transitory memory. The non-transitory memory may be configured to store an operating system for the server, authentication data, and an authentication engine. The authentication data may be of the first user, the second user, or other users.

The authentication engine may run on the processor. The authentication engine may be configured to receive the first measured biometric attribute from the IoT device. The authentication engine may store the first measured biometric attribute. The authentication engine may compare the first measured biometric attribute to the authentication data of the first user stored in the non-transitory memory. When the measured biometric attribute(s) matches the stored authentication data, the authentication engine may authenticate the first user.

The authentication engine may send the authentication confirmation to the IoT device. The authentication engine may receive the transaction instructions from the IoT device and process the transaction instructions from the first user.

The authentication process may be repeated for the second or other users.

In an embodiment, the monitoring engine may determine the second measured biometric attribute belongs to the second user by comparing it with the first measured biometric attribute through an artificial intelligence/machine learning ("AI/ML") algorithm.

In an embodiment, one of the biometric sensors may be a camera for facial recognition.

In an embodiment, one of the biometric sensors may be a microphone for voice recognition.

In an embodiment, one of the biometric sensors may be a camera for gait recognition.

In an embodiment, one of the biometric sensors may be a camera configured to scan one or more physical characteristics of each user.

In an embodiment, the pre-determined time interval may be one second.

In an embodiment, the pre-determined time interval may be variable.

An apparatus for continuous real-time authentication using Internet-of-things ("IoT") devices is provided. The apparatus may include one or more IoT devices and a server. The server may be centralized or distributed.

The IoT devices may each include a communication link, a processor, one or more biometric sensors, and a non-transitory memory. The non-transitory memory may be configured to store at least an operating system and a monitoring engine.

The monitoring engine may be configured to measure one or more biometric attributes of a first user with the one or more biometric sensors at a pre-determined time interval. The monitoring engine may also be configured to transmit the measured biometric attributes to the server. The engine may also listen for and wait for a transaction instruction from the first user. Once a transaction instruction is received, the engine may transmit the instruction to the server. The engine may also be configured to receive confirmation from the server that the transaction was completed, and then inform the first user that the transaction was completed.

The server may include a communication link, a processor, and non-transitory memory. The non-transitory memory may be configured to store, inter alia, a server operating system, authentication data of the first user, as well as other users, and an authentication engine that runs on the processor.

The authentication engine may be configured to receive the measured biometric attributes of the first user from the IoT devices, store the measured biometric attributes, and compare the measured biometric attributes to the authentication data. If the data matches to a pre-determined confidence level (e.g., more likely than not, or 99%), the authentication engine may authenticate the first user.

The authentication engine may also be configured to receive the transaction instructions from the IoT devices, process the transaction instructions, if the first user is authenticated, and transmit a confirmation of the completed, processed transaction to the IoT devices.

The authentication engine may also be configured to determine if and when the measured biometric attributes do not match the authentication data of the first user, indicating that the first user is actually a second user. If and when the measured biometric attributes indicate the second user, the authentication engine may be configured to attempt to authenticate the second user and ignore any transaction instructions from the second user until the second user is authenticated.

The authentication engine may determine that the first user is actually the second user by comparing the measured biometric attributes with the authentication data of the first user and determining that they do not match to a predetermined confidence level.

In an embodiment, the authentication engine may determine the first user is actually the second user by comparing the measured biometric attributes with the authentication data of the first user with an artificial intelligence/machine learning ("AI/ML") algorithm.

In an embodiment, the pre-determined time interval may be one minute.

In an embodiment, the pre-determined time interval may be variable. In an embodiment, the authentication engine may vary the pre-determined time interval through an artificial intelligence/machine learning ("AI/ML") algorithm.

A method for continuous real-time authentication using Internet-of-things ("IoT") devices is provided. The method may include storing, at a centralized database at a server, one or more encrypted biometric attributes of a user. The server may centralized. The server may be distributed. The database may be distributed across multiple servers. The method may include receiving a request to authenticate the user from an IoT device, at an authentication engine at the server.

The method may include the authentication engine performing an authentication process. The authentication process may include directing an IoT device to capture, and capturing, by one or more biometric sensors on the IoT device, one or more biometric attributes of the user. The authentication process may include the IoT device transmitting the captured biometric attributes of the user to the authentication engine. The authentication process may include the authentication engine receiving the captured biometric attributes of the user and comparing the captured biometric attributes of the user to the encrypted biometric attributes stored in the database. If the captured attributes match to a pre-determined confidence level, the user may be authenticated.

The method may include repeating the authentication process at a pre-determined time interval, and when the authentication engine is unable to authenticate the user, invalidating authentication of the user.

In an embodiment, the pre-determined time interval may be between one millisecond and 120 seconds.

In an embodiment, the pre-determined time interval may be variable. In an embodiment, the variable pre-determined time interval may be set by an artificial intelligence/machine learning ("AI/ML") algorithm.

In an embodiment, the method may include the IoT device monitoring the user, receiving transaction instructions from the user, and transmitting the transaction instructions to the server. The method may include processing the transaction instructions so long as the authentication process has been completed successfully during the pre-determined time interval and informing the IoT device when the transaction instructions are processed successfully or unsuccessfully.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

It is an object of this disclosure to provide apparatus and methods for continuous and real-time authentication of a user utilizing IoT devices.

An apparatus for continuous and constant real-time authentication using Internet-of-things ("IoT") devices is provided. The apparatus may include one or more IoT devices and a server. The IoT device or devices may be located in a particular location, such as a single room, or a particular area in a room.

The server may be centralized or distributed. A centralized server may be advantageous with respect to cost and security. However, a server distributed over multiple computing devices may be more powerful and provide redundancies a centralized server cannot.

Each IoT device may include a communication link, a processor, one or more biometric sensors, and a non-transitory memory. The server may include a communication link, a processor, and a non-transitory memory.

The communication link may be any suitable communication type, such as Wi-Fi, Ethernet, cellular frequencies, Bluetooth, or other standard communication methods. The communication link may allow the IoT device to communicate with the server and other IoT devices over a network. The communication link may include any necessary hardware (e.g., antennae) and software to control the link. In an embodiment, the network may be the Internet. In another embodiment, the network may be an internal intranet.

The processor may be a microprocessor. Multiple processors or microprocessors may be used. Multiple processors may increase the capability of the IoT device. More processing power and memory may increase the functionality of the IoT device by allowing for more robust analysis and computation and increasing the amount of data storage for the IoT device.

The non-transitory memory may be configured to store an operating system for the IoT device, and a monitoring engine. The non-transitory memory may also store other applications as well as data, as necessary. The applications, including the operating system and the AI/ML communication engine may run on the processor(s).

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The processor(s) may control the operation of the apparatus and its components, which may include RAM, ROM, an input/output module, and other memory. The microprocessor may also execute all software running on the apparatus—e.g., the operating system and any applications such as the monitoring engine, authentication engine, and any security protocols. Other components commonly used for computers, such as EEPROM or Flash memory or any other suitable components, may also be part of the apparatus.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology e.g., a hard drive or other non-transitory memory. The memory may store software including an operating system and any application(s) (such as the monitoring engine and authentication engine) along with any data needed for the operation of the apparatus and to allow for continuous and constant authentication of a user. The data may also be stored in cache memory, or any other suitable memory. Alternatively, some or all of computer executable instructions (alternatively referred to as "code") may be embodied in hardware or firmware.

The IoT device and server may each include input/output modules. An input/output ("I/O") module may include connectivity to a keyboard, monitor, speaker, microphone, camera, screen, or network interface through which a user may provide input. The input may include input relating to cursor movement. The input/output module may also include one or more speakers for providing audio output and a video display device, such as an LED screen and/or touchscreen, for providing textual, audio, audiovisual, and/or graphical output.

The monitoring engine may run on the processor. The monitoring engine may be configured to measure one or more biometric attributes of a user. The user may be a first user. In an embodiment, the monitoring engine may be able to monitor multiple users at one time. Any suitable biometric attributes may be measured, contingent upon the biometric sensors available to the IoT device. Facial recognition, gait recognition, body part measurements, voice recognition, fingerprints, iris scans, typing speed, and other biometric attributes and measurements may be used.

After a user is authenticated, the monitoring engine may continue to monitor the user, so that the user may stay authenticated without any conscious interaction by the user, until the monitoring engine can no longer authenticate the user. For example, if the user is initially authenticated through facial recognition, as long as the monitoring engine can see the user's face, the user may stay authenticated. If the user leaves the room containing the IoT device, the user may lose authentication. Similarly, if the user is authenticated via voice recognition, as long as the user is speaking, the user will remain authenticated.

The measurements by the IoT device's biometric sensors may take place at pre-determined time intervals. For example, the IoT device may try a facial recognition scan every minute or monitor for a voice recognition every 10 seconds. In an embodiment, if the biometric attribute measured requires a camera, microphone, or radar system, or other biometric sensor with the capability of being constantly on, the biometric sensor may continuously and constantly monitor the user. For example, if a camera is used, once the user is authenticated, as long as the user stays within view of the camera, the user may stay authenticated, as the camera will remain on and watching. Only when the user removes herself from view of the camera will the user lose authentication and be required to be authenticated again. In another example, if voice recognition is used, as long as the user is speaking in range of the microphone, the user may stay authenticated, as the microphone will remain on and listening.

In an embodiment, the monitoring engine may transmit a first measured biometric attribute of the first user to the server. For example, as soon as a user walks into view of a camera biometric sensor of the IoT device, the camera may measure the appropriate biometric attribute. This measurement may then be transmitted to the server for authentication purposes. The monitoring engine may then receive confirmation that the first user is authenticated from the server. Or the monitoring engine may receive confirmation that the measured biometric attributes do not belong to the first user. If the first user is authenticated, the monitoring engine may then monitor the first user to keep the first user in an authenticated state (e.g., the user cannot leave the room containing the IoT device) and wait for a transaction instruction from the first user. The transaction instruction may be to, e.g., transfer money from one bank account to another, or pay a certain bill. The monitoring engine may transmit the first user's transaction instruction to the server along with the confirmation of authentication.

If the server has processed the transaction as instructed, because the user has been authenticated, the monitoring engine may receive a confirmation from the server that the transaction requested was completed. The monitoring engine may inform the first user that the transaction was completed. The engine may inform the user by making an announcement, vibrating, sending an email, sending a text, displaying confirmation on a screen, or through any other suitable method.

As the biometric attribute measurements continuously take place at the pre-determined time intervals, the monitoring engine may determine if the first user has been replaced by a second user when the first measured biometric attribute changes to a second measured biometric attribute. For example, if a second user enters the room with the IoT device, and the first user leaves, the measured biometric attributes may change. The monitoring engine may determine the second measured biometric attribute belongs to the second user by comparing it with the first measured biometric attribute. Different measured biometric attributes imply different users. Alternatively, the monitoring engine may determine that the first user is no longer authenticated if, for example, the first user leaves the room containing the IoT device or walks out of range or view of the biometric sensor(s). In an embodiment, the monitoring engine may determine the second measured biometric attribute belongs to the second user by comparing it with the first measured biometric attribute through an artificial intelligence/machine learning ("AI/ML") algorithm. Any appropriate AI/ML algorithm or algorithms may be used. The Ai/ML algorithms may be trained by past authentications of the respective users, as well as history of other authentications. For example, an AI/ML algorithm may learn that the first user always leaves the room with the IoT device when a particular second user enters the room. Therefore, the AI/ML algorithm will learn that the first user will lose authentication when the second user appears.

If the first user has been replaced by the second user, the monitoring engine may receive a second transaction instruction from the second user. The monitoring engine may ignore the second transaction instruction until the second user is authenticated by the server. Once the second user has been authenticated, the second user may become the first user for purposes of the monitoring engine and authentication engine.

The server's non-transitory memory may be configured to store an operating system for the server, authentication data, and an authentication engine. The authentication data may be of the first user, the second user, or other users.

The authentication engine may run on the server's processor(s). The authentication engine may be configured to receive and store the first measured biometric attribute from the IoT device. The authentication engine may store the first measured biometric attribute in the server's non-transitory memory. The server's non-transitory memory may include a database. The authentication engine may compare the first measured biometric attribute to the authentication data of the first user stored in the server's non-transitory memory. When the measured biometric attribute(s) matches the stored authentication data, the authentication engine may authenticate the first user. The authentication engine may search all stored data to find a match to determine which user the IoT device is attempting to authenticate. If the authentication engine does not find a match, it may inform the IoT device that there is no match, and the user cannot be authenticated.

The authentication engine may send the authentication confirmation to the IoT device. The authentication engine may receive the transaction instructions from the IoT device and process the transaction instructions from the first user. The authentication process may be repeated for the second or other users.

In various embodiments, the biometric sensor(s) on the IoT devices may be of any suitable type. For example, a camera or cameras that may be used for facial recognition, gait recognition, or to scan physical characteristics of the users (such as arm lengths, hand lengths, leg lengths etc.), fingerprint or palm print scanners, radar systems, microphones for voice recognition and typing speed recognition (if the keyboard is loud enough). Other biometric sensors may be used.

In various embodiments, the pre-determined time interval where the IoT device measures biometric attributes of the user may vary and may be variable. The time intervals can range anywhere from every millisecond to every ten minutes or so. Longer intervals may be less secure, and shorter intervals may enable constant and continuous authentication and monitoring.

In an embodiment, the monitoring engine or the authentication engine may vary the pre-determined time interval through an algorithm. The algorithm may be an AI/ML algorithm. The interval may be shortened depending on the type or types of transactions contemplated, as a shorter interval may be more secure. If the type of transaction does not need to be as secure, the interval may be lengthened, saving computing resources and bandwidth.

An apparatus for continuous real-time authentication using Internet-of-things ("IoT") devices is provided. The apparatus may include one or more IoT devices and a server. The server may be centralized or distributed. In this embodiment, the IoT devices are used for their biometric sensors and to communicate with the user(s). Most of the calculations and programming decisions will be performed by the authentication engine on the server, as opposed to the monitoring engine on the IoT devices.

The IoT devices may each include a communication link, a processor, one or more biometric sensors, and a non-transitory memory. The non-transitory memory may be configured to store at least an IoT operating system and a monitoring engine. The monitoring engine may be configured to measure one or more biometric attributes of a first user with the one or more biometric sensors at a pre-determined time interval. In various embodiments, the pre-determined time interval may be fixed at a specific time (e.g., one minute, one second, or five seconds), or it may be variable. The interval may vary depending on the types of transactions the authentication server and IoT device contemplate and can process. The shorter the interval the more secure the authentication may be. However, certain transactions do not need to be as secure as other transactions and computing power and resources may be conserved if the interval is lengthened.

In an embodiment, an administrator may set the interval and vary the interval. In an embodiment, the authentication engine may vary the pre-determined time interval through an artificial intelligence/machine learning ("AI/ML") algorithm that takes into account past transactions, past security breaches, the needs of the transaction, as well as administrator inputs.

The monitoring engine may also be configured to transmit the measured biometric attributes to the server. The engine may also listen for and wait for a transaction instruction from the first user. Once a transaction instruction is received, the engine may transmit the instruction to the server. The engine may also be configured to receive confirmation from the server that the transaction was completed, and then inform the first user that the transaction was completed. As such, the monitoring engine may act more as a conduit of information to the server, rather than processing information itself.

The server may include a communication link, a processor, and non-transitory memory. The non-transitory memory may be configured to store, inter alia, a server operating system, authentication data of the first user, as well as other users, and an authentication engine that runs on the processor. The authentication engine may be configured to receive the measured biometric attributes of the first user from the IoT devices, store the measured biometric attributes, and compare the measured biometric attributes to the authentication data. If the data matches to a pre-determined confidence level (e.g., more likely than not, or 90%), the authentication engine may authenticate the first user. The authentication engine may also be configured to receive the transaction instructions from the IoT devices, process the transaction instructions, if the first user is authenticated, and transmit a confirmation of the completed, processed transaction to the IoT devices.

The authentication engine may also be configured to determine if and when the measured biometric attributes do not match the authentication data of the first user, indicating that the first user is actually a second user. Alternatively, the authentication engine may determine that the first user can no longer be authenticated if it does not receive valid biometric attributes measured by the IoT devices. For example, if the user leaves the room with the IoT device or exits the view of the camera biometric sensor, or if the user moves far enough away the biometric sensor can no longer provide measurements to the required confidence level for the authentication engine. At that point, the authentication engine may deny authentication to the first user. In an alternate situation, the first user may leave and be replaced by a second user, or a second user can join the first user, and the IoT device may send multiple biometric attribute measurements to the authentication engine. If and when the measured biometric attributes indicate the second user, the authentication engine may be configured to attempt to authenticate the second user and ignore any transaction instructions from the second user until the second user is authenticated.

In an embodiment, the IoT devices may measure multiple users' biometric attributes at a single time and transmit the multiple measurements to the authentication server. The authentication server can analyze each measurement and authenticate as many users as it can, assuming the measurements reach a pre-determined accuracy/confidence level. In an embodiment, the authentication engine may authenticate some of the users and reject authentication attempts of the remaining users, based on the biometric attributes. In an embodiment, the authentication engine may only process transaction instructions from users who have been (and remain) authenticated, while ignoring instructions from users who have not been authenticated (until they are authenticated).

The authentication engine may determine that the first user is actually the second user by comparing the measured biometric attributes with the authentication data of the first user and determining that they do not match to a predetermined confidence level. The confidence level may be more likely than not, or it may be higher. A 100% confidence level may be required for the most secure transactions. In an embodiment, the authentication engine may determine the first user is actually the second user by comparing the measured biometric attributes with the authentication data of the first user with an artificial intelligence/machine learning ("AI/ML") algorithm. Any suitable AI/ML algorithm may be used. Some factors the AI/ML algorithm may factor in may be past interactions, past confidence levels, past accuracy of various biometric sensors, as well as historical actions taken by the first user (e.g., if the first user always leaves sight of the IoT device after 15 minutes, or appears, leaves, and reappears at certain intervals, etc.).

A method for continuous real-time authentication using Internet-of-things ("IoT") devices is provided. The method may include storing, at a centralized database at a server, one or more encrypted biometric attributes of a user. The server may be centralized. The server may be distributed. In an embodiment, the database may be distributed across multiple servers. The method may include receiving a request to authenticate the user from an IoT device, at an authentication engine at the server. In an embodiment, the request may be repeated at pre-determined time intervals.

The method may include the authentication engine performing an authentication process. The authentication process may be repeated for each request or repeated for each biometric attribute measurement received. The authentication process may be repeated until the IoT device is no longer capturing biometric attributes from any user.

The authentication process may include directing an IoT device to capture (i.e., measure), and capturing, by one or more biometric sensors on the IoT device, one or more biometric attributes of the user. In an embodiment, the IoT device may capture biometric attributes of multiple users.

The authentication process may include the IoT device transmitting the captured biometric attributes of the user or users to the authentication engine. The authentication process may include the authentication engine receiving the captured biometric attributes of the user and comparing the captured biometric attributes of the user to the encrypted biometric attributes stored in the database. If the captured attributes match to a pre-determined confidence level, the user may be authenticated. When the authentication engine is unable to authenticate the user, invalidating or denying authentication of the user.

The comparison may be repeated for each biometric attribute measured or captured by the IoT device. In an embodiment, the authentication engine may authenticate multiple users at one time.

The method may include repeating the authentication process at a pre-determined time interval. In an embodiment, the pre-determined time interval and repetition may only begin after the initial request to authenticate. In an embodiment, the authentication process may be repeated as long as the IoT device is active and able to measure biometric attributes. In an embodiment, the authentication process may be repeated as long as the IoT device is active and is actually measuring biometric attributes, i.e., while there is a user or user within range of the biometric sensors of the IoT device. The IoT device may go into a 'sleep' mode if there are no users within range of the biometric sensor(s).

In an embodiment, the method may include the IoT device monitoring the user, receiving transaction instructions from the user, and transmitting the transaction instructions to the server. The method may include processing the transaction instructions so long as the authentication process has been completed successfully during the pre-determined time interval and informing the IoT device when the transaction instructions are processed successfully or unsuccessfully. For example, if the time interval is one minute, if the user has been authenticated within the past minute before the transaction instructions were received, the engine may treat the user as authenticated and process the transaction. If the time interval is 20 seconds but the transactions instructions were received one minute after the last successful authentication process, the engine may treat the user as not authenticated and deny processing the transaction.

In an embodiment, the pre-determined time interval may be between one millisecond and 600 seconds. In other embodiments, the time interval may be longer, however, longer time intervals may be less secure. In an embodiment, the pre-determined time interval may be variable. In an embodiment, the pre-determined time interval may be manually adjusted, for example by an administrator. In an embodiment, the variable pre-determined time interval may be set by an artificial intelligence/machine learning ("AI/ML") algorithm. Various factors may be used by the AI/ML algorithm, including past history of the user and what type or types of transactions the authentication engine is capable of processing. The more security needed for a transaction (e.g., transferring a large sum of money) the shorter the interval should be. Conversely, a benign transaction (e.g., an in-app purchase of 0.99$) may require less security and the interval may be lengthened.

In an embodiment, the monitoring engine and the authentication engine may be incorporated into various software applications as a separate module, as opposed to being separate applications. Alternatively, the monitoring engine may act as a third-party application watching over or injecting itself into existing software applications on the IoT device(s).

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
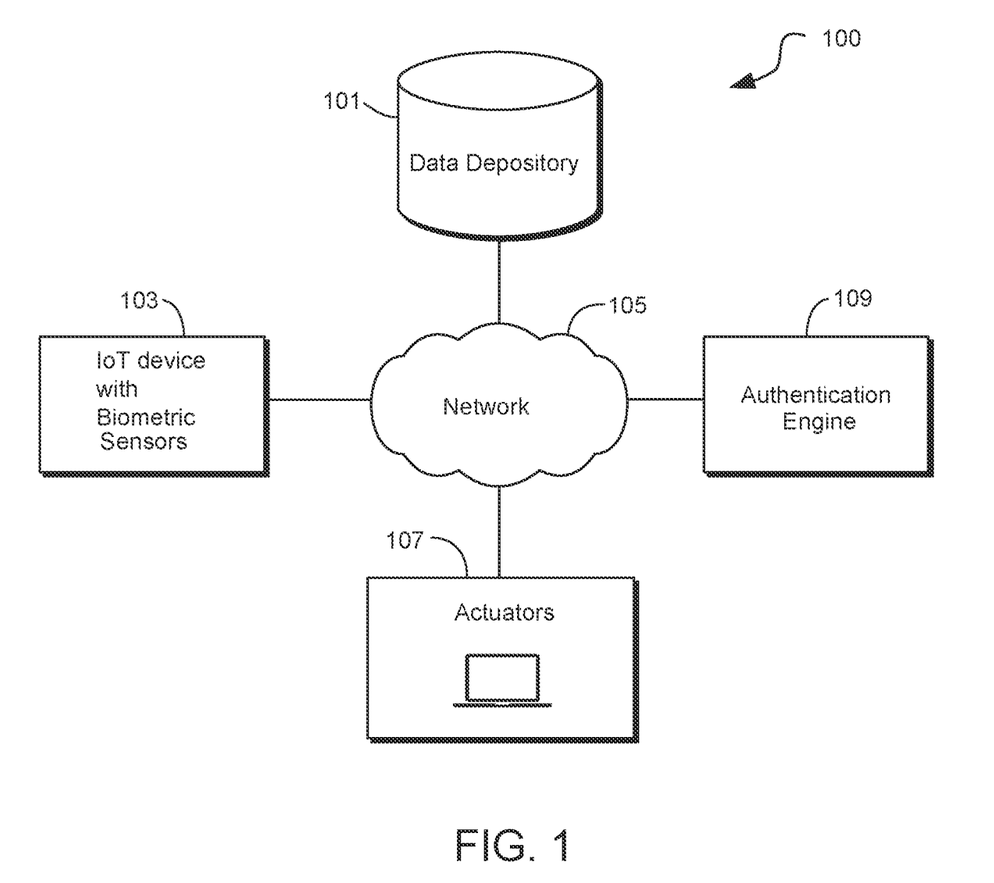
FIG. 1 shows an illustrative architecture in accordance with principles of the disclosure.

FIG. 1 shows illustrative system architecture 100. Architecture 100 may represent an interne of things ("IoT") or other network. A differentiator between IoT and conventional networks is a traffic profile. In an IoT, nodes may not have defined or known network positions, communication protocols or security services.

Architecture 100 may include nodes. Each node may include two or more nodes. FIG. 1 shows exemplary nodes 101, 103, 105, 107 and 109. Nodes 101, 103, 105, 107 and 109 may execute one or more of the functions of the IoT network described herein. The IoT network may include data depository 101, biometric sensors 103, authentication engine 109 (located on server, distributed or centralized) and/or actuators 107. The IoT network may include any additional hardware such as receivers, transmitters, processors, databases, and any other suitable hardware.

The architecture includes biometric sensors 103. Biometric sensors 103 may include sensors that sense biometric attributes. For example, biometric sensors may be embedded in "smart" clothing that monitors a wearer's physical condition. Such clothing may capture biometric data, such as pulse rate, temperature, muscle contraction, heart rhythm and physical movement. Biometric sensors may include cameras (for facial, body part, iris, gesture, and/or gait recognition), microphones for voice recognition, fingerprint or palm print scanners, and other suitable biometric sensors.

Biometric sensors may be any suitable size. For example, sensors may be a few millimeters in size. Sensors may be deployed in a wide variety of locations on an IoT device. Sensors may be relatively inexpensive and have low energy consumption. Sensors may "sense" (i.e., capture or measure) one or more biometric attributes.

Sensors may transmit captured/measured biometric attributes to another node. Sensors may broadcast captured data to two or more nodes. The biometric sensors may be activated and run by a monitoring engine module located on an IoT device.

Captured/measured data may be transmitted using any suitable transmission method. For example, data captured by a sensor may be extracted by a mobile phone. Sensors may leverage a communication link provided by a mobile phone to communicate captured data to another node.

Captured/measured data/biometric attributes may be transmitted by the sensor and processed far from the location of the IoT device that captured the data. For example, captured data may be transmitted from the IoT device to another node until the captured data reaches the authentication engine 109 or data repository 101.

Based on data captured from biometric sensors 103, actuators 107 may respond to a detected event. Based on the capture and analysis of multiple sources of data, actuators 107 may be instructed to take action without human intervention. Actuators can be a screen or speaker, that may inform a user that a transaction was processed.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node or IoT device may operate in a networked environment. A node may be part of two or more networks. A node may support establishing network connections to one or more remote nodes. Such remote nodes may be other IoT devices, servers or other computing devices. Nodes may be personal computers or servers. Network connections may include a local area network ("LAN") and a wide area network ("WAN") and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information, as long as the IoT devices have one or more biometric sensors.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed of without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Biometric sensors in a single architecture or other grouping may be produced by different manufacturers. Sensors may capture data in different formats. For example, sensors may use different data structures to package captured data. Biometric sensors 103 may utilize different communication protocols to transmit captured data or communicate with other IoT devices or servers. Despite such operational differences, biometric sensors 103 may operate substantially seamlessly together. Interoperability may allow captured data to be substantially seamlessly captured and interpreted by authentication engine 109 or monitoring engine (not shown). Based on interpreting the captured data, authentication engine 109 may authenticate a user and process transactions.

Interoperability may be implemented across any suitable nodes of architecture 100. Interoperability may enable communication between biometric sensors 103 and other devices or servers. Interoperability may enable architecture 100 to provide services and applications via actuators 107. Interoperability may allow services and content to be provided anywhere, anytime and based on input/output of different nodes.

Data gathering/biometric attribute measuring by one or more biometric sensors 103 may be controlled by one or more other nodes of architecture 100. For example, authentication engine 109 may direct sensors 103 to capture data at pre-determined intervals. Alternatively, biometric sensors 103, as part of an IoT device, may be directed by a monitoring engine on the IoT device.

Timing of when data is captured by sensors 103 may be controlled by any suitable node on architecture 100. For example, data may be captured in real-time or at pre-defined intervals such as once a day.

Authentication engine 109 may filter data captured by biometric sensors 103. Authentication engine 103 may repackage or reformat captured data. Data conversion may include transformation of low-level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Authentication engine 109 may perform pattern recognition to identify correlations and trends in captured data. Authentication engine 109 may also evaluate a cost of obtaining data. "Costs" may be monetary (e.g., labor costs or infrastructure costs), time-related or related to a level of intrusion needed to obtain desired data. "Costs" may be bandwidth related. In other embodiments, the monitoring engine on the IoT device may perform these calculations.

For example, a communication link may be associated with a fixed bandwidth. The bandwidth may limit an amount of information or a rate of transmission over the communication link.

Data travelling within architecture 100 to/from nodes may be routed along multiple communication links until the transmitted information reaches a desired destination node (e.g., authentication engine 109 located on a server). Each communication link may service a number of connected nodes and a respective volume of informational traffic.

Data repository 101 may receive data captured by biometric sensors 103. In some embodiments, data captured by sensors 103 may be transmitted directly to authentication engine 109. In some embodiments, data repository 101 may be a part of the server housing authentication engine 109. Data stored in repository 101 may be sorted and analyzed by authentication engine 109. Data stored in data repository 101 may be so voluminous and complex (e.g., structured/unstructured and/or constantly changing) that traditional data processing application software may be inadequate to meaningfully process the data (e.g., "big data"). Authentication engine 109 may include software applications specially designed to process large volumes of data ("big data analytics").

Architecture 100 may include one or more layers of software applications. Software applications may implement a variety of functions and provide varied services to nodes of architecture 100. Software applications running on authentication engine 109 may submit requests to biometric sensors 103 for retrieval of specific data to achieve a functional goal of authentication a user. Software applications may control data captured by sensors 103. Software applications may control a flow of information within architecture 100.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or authentication engine 109.

Software applications may provide security services that mitigate threats to the integrity of data captured by sensors 103 or architecture 100 generally.

Actuators 107 may respond to data transmitted or processed by other nodes such as authentication engine 109. Actuators 107 may include devices that notify a user of authentication states, or transaction states (completed, processed, denied, etc.).

In the absence of express relationships between sensors and the devices that access data captured by the sensors traditional approaches for managing trust, security naming, discovery, or other traditional network services may not be applicable or available. Apparatus and methods provided herein may provide real-time and continuous authentication using IoT devices.

Generally, nodes of architecture 100 may interact and cooperate using one or more interaction paradigms. Exemplary interaction paradigms include client-server and peer-to-peer interactions.

As a result of the disparate nature of sensors 103, an architecture, such as architecture 100 incorporating IoT devices with biometric sensors 103 may support a variety of communication protocols. Illustrative supported protocols may include Hypertext Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 mW (milliwatt) for 1 mW transmission power over a range of 10 to 100 meters and a data transmission rate of 250 kbit/s.

To conserve energy, an IoT device may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 100. The function of this physical layer is to provide communication pathways to carry and exchange data and network information between multiple sub-networks and nodes. Such communication links may be wired or wireless. Exemplary wireless communication links may include Bluetooth, Wi-Fi, 3G, 4G, 5G and LTE.

Figure 2:
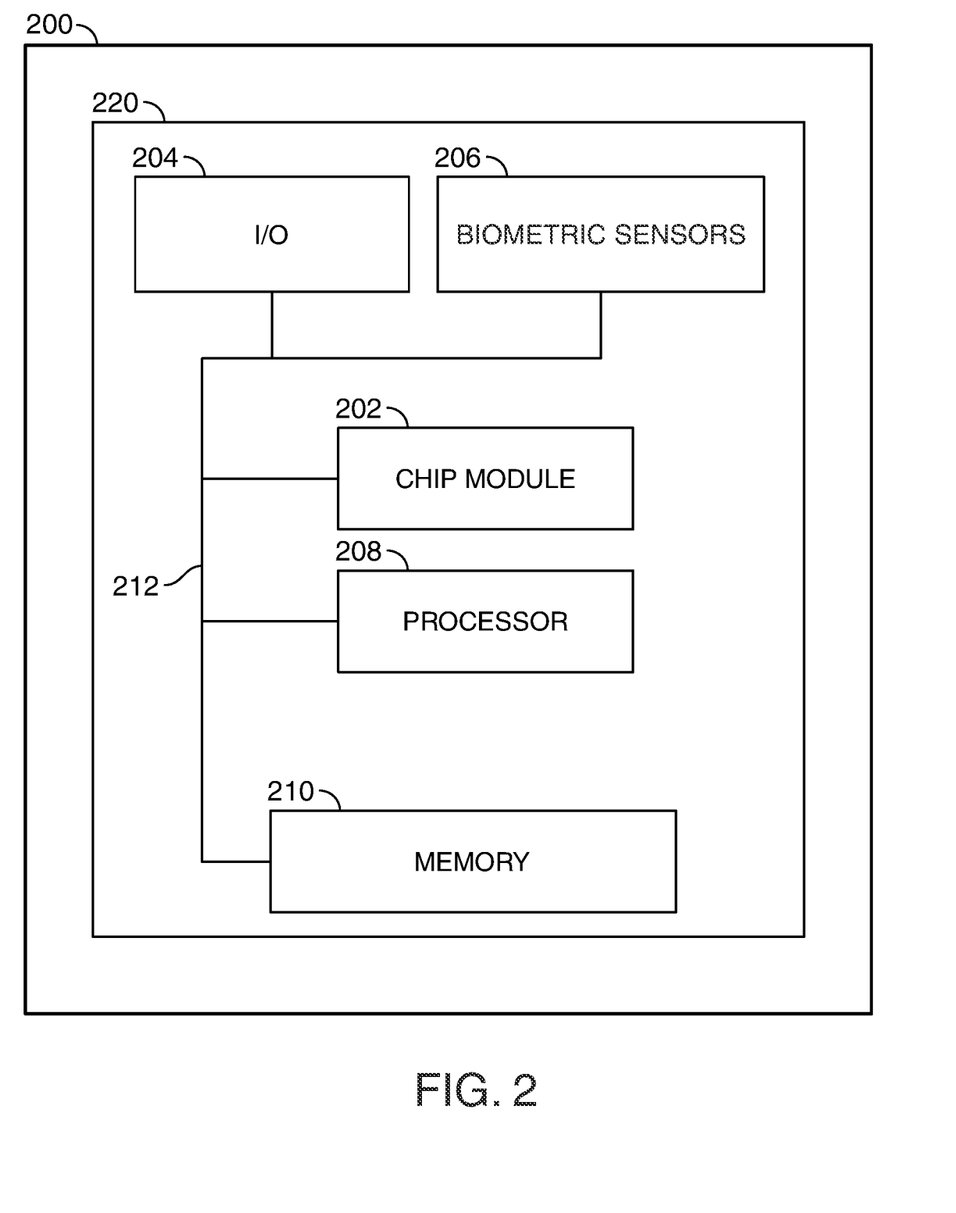
FIG. 2 shows an illustrative apparatus in accordance with principles of the disclosure.

FIG. 2 shows illustrative apparatus 200 that may be configured in accordance with the principles of the disclosure. Apparatus 200 may be an IoT device with various biometric sensors 206. Apparatus 200 may include one or more features of the architecture/apparatus shown in FIGS. 1 and 3. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an LED screen, a touchscreen or any other suitable media or devices; biometric sensors 206, which may include cameras and fingerprint scanners or any other suitable biometric sensors; logical processing device 208, which may compute data information and structural parameters of various applications including a monitoring engine; and machine-readable memory 210.

Machine-readable memory 210 may be configured to store in machine-readable data structures: machine executable instructions (which may be alternatively referred to herein as "computer instructions" or "computer code"), applications such as an IoT operating system and a monitoring engine, signals, recorded data, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
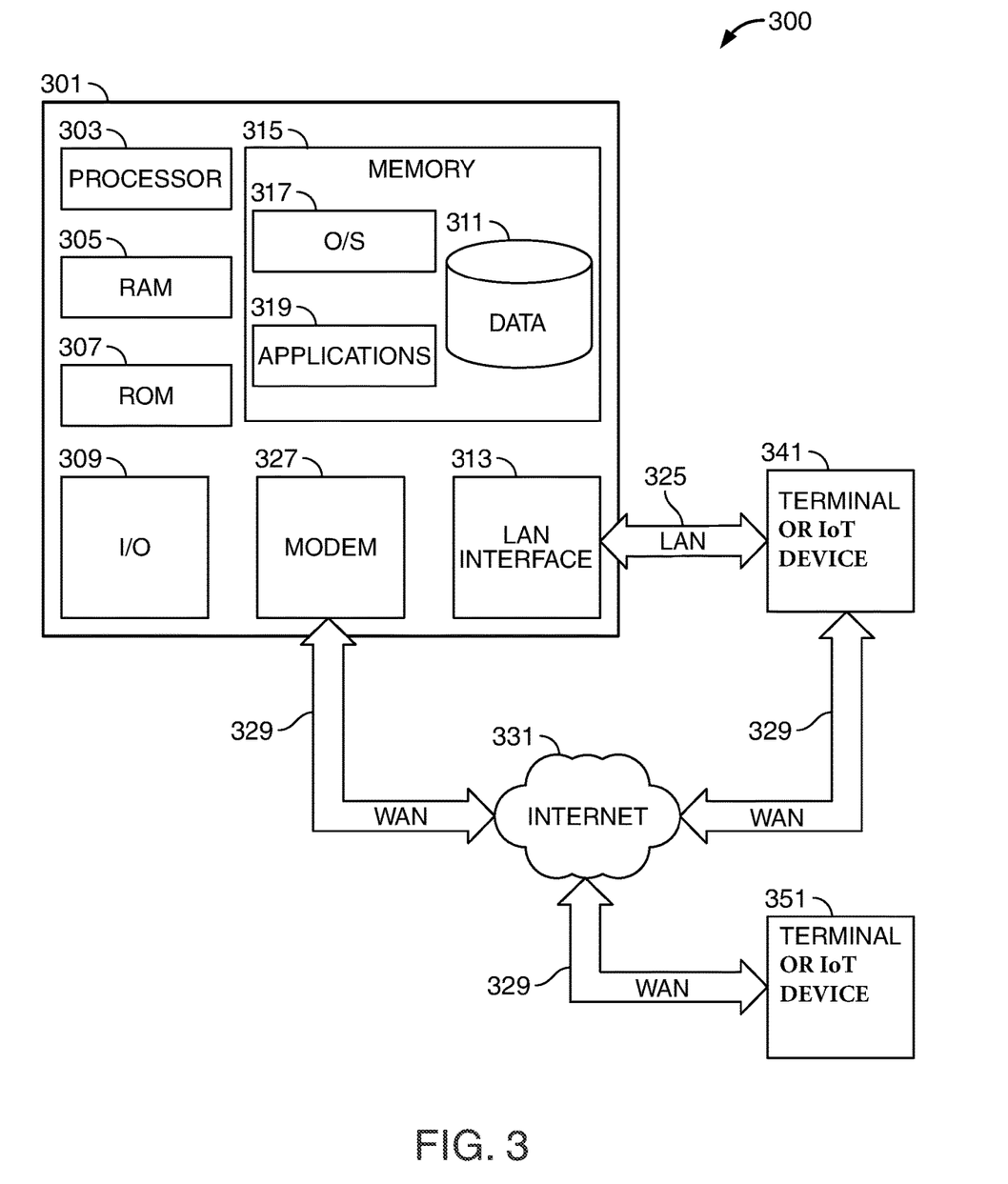
FIG. 3 shows an illustrative apparatus in accordance with principles of the disclosure.

FIG. 3 shows an illustrative block diagram of apparatus 300 that includes a server 301. Biometric sensor apparatus 301 may alternatively be referred to herein as a "computing device." Elements of apparatus 300, including server 301, may be used to implement various aspects of the apparatus and methods disclosed herein. A "user" of apparatus 300 or server 301 may include other computer systems or servers, or a human.

Server 301 may have a microprocessor 303 for controlling the operation of the device and its associated components, and may include RAM 305, ROM 307, input/output module 309, and a memory 315. The microprocessor 303 may also execute all software running on the server 301—e.g., the operating system 317 and applications 319 such as the authentication engine and a security protocol. Other components commonly used for computers, such as EEPROM or Flash memory or any other suitable components, may also be part of the server 301.

The memory 315 may be comprised of any suitable permanent storage technology—e.g., a hard drive or other non-transitory memory. The ROM 307 and RAM 305 may be included as all or part of memory 315. The memory 315 may store software including the operating system 317 and application(s) 319 (such as an authentication engine) along with any other data 311 (e.g., biometric attributes or hash values of a user) needed for the operation of the apparatus 300. Memory 315 may also store biometric attributes measured by biometric sensors. The biometric attributes may also be stored in cache memory, or any other suitable memory. Alternatively, some or all of computer executable instructions (alternatively referred to as "code") may be embodied in hardware or firmware (not shown). The microprocessor 303 may execute the instructions embodied by the software and code to perform various functions.

In an embodiment of the server 301, the microprocessor 303 may execute the instructions in all or some of the operating system 317, any applications 319 in the memory 315, any other code necessary to perform the functions in this disclosure, and any other code embodied in hardware or firmware (not shown).

An input/output ("I/O") module 309 may include connectivity to a keyboard, monitor, microphone or network interface through which higher hierarchal server or a user of server 301 may provide input. The input may include input relating to cursor movement. The input/output module 309 may also include one or more speakers for providing audio output and a video display device, such as an LED screen and/or touchscreen, for providing textual, audio, audiovisual, and/or graphical output (not shown). The input and output may be related to biometric attribute measurements captured by an IoT device and transmitted to the server and processed through the processor 303.

Apparatus 300 may be connected to other systems, computers, servers, and/or the Internet 331 via a local area network (LAN) interface 313.

Apparatus 300 may operate in a networked environment supporting connections to one or more remote computers and servers, such as terminals 341 and 351, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or Wi-Fi).

Terminals 341 and 351 may be IoT devices as described herein, or personal computers or servers that include many or all of the elements described above relative to apparatus 300. The network connections depicted in FIG. 3 include a local area network (LAN) 325 and a wide area network (WAN) 329 but may also include other networks. Server 301 may include a network interface controller (not shown), which may include a modem 327 and LAN interface or adapter 313, as well as other components and adapters (not shown). When used in a LAN networking environment, server 301 is connected to LAN 325 through a LAN interface or adapter 313. When used in a WAN networking environment, server 301 may include a modem 327 or other means for establishing communications over WAN 329, such as Internet 331. The modem 327 and/or LAN interface 313 may connect to a network via an antenna (not shown). The antenna may be configured to operate over Bluetooth, Wi-Fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Application program(s) 319 (which may be alternatively referred to herein as "plugins," "applications," or "apps") may include computer executable instructions for invoking user functionality related to performing various tasks. In an embodiment, application program(s) 319 may be cloud-based applications. In an embodiment, application program(s) 319 may be an authentication engine and a security protocol. The various tasks may be related to authenticating a user via biometric sensors and determining which sensor to use through a context-based analysis.

Biometric sensor apparatus 301 may also include various other components, such as a battery (not shown), speaker (not shown), a network interface controller (not shown), and/or antennas (not shown).

Terminal 351 and/or terminal 341 may be IoT devices with biometric sensors. Terminal 351 and/or terminal 341 may be portable devices such as a laptop, cell phone, tablet, smartphone, or any other suitable device for receiving, storing, transmitting and/or displaying relevant information. Terminal 351 and/or terminal 341 may be other devices such as remote servers.

Any information described above in connection with data 311, and any other suitable information, may be stored in memory 315. One or more of applications 319 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. Each node, other than servers, should have one or more biometric sensors to measure biometric attributes of a user.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 4:
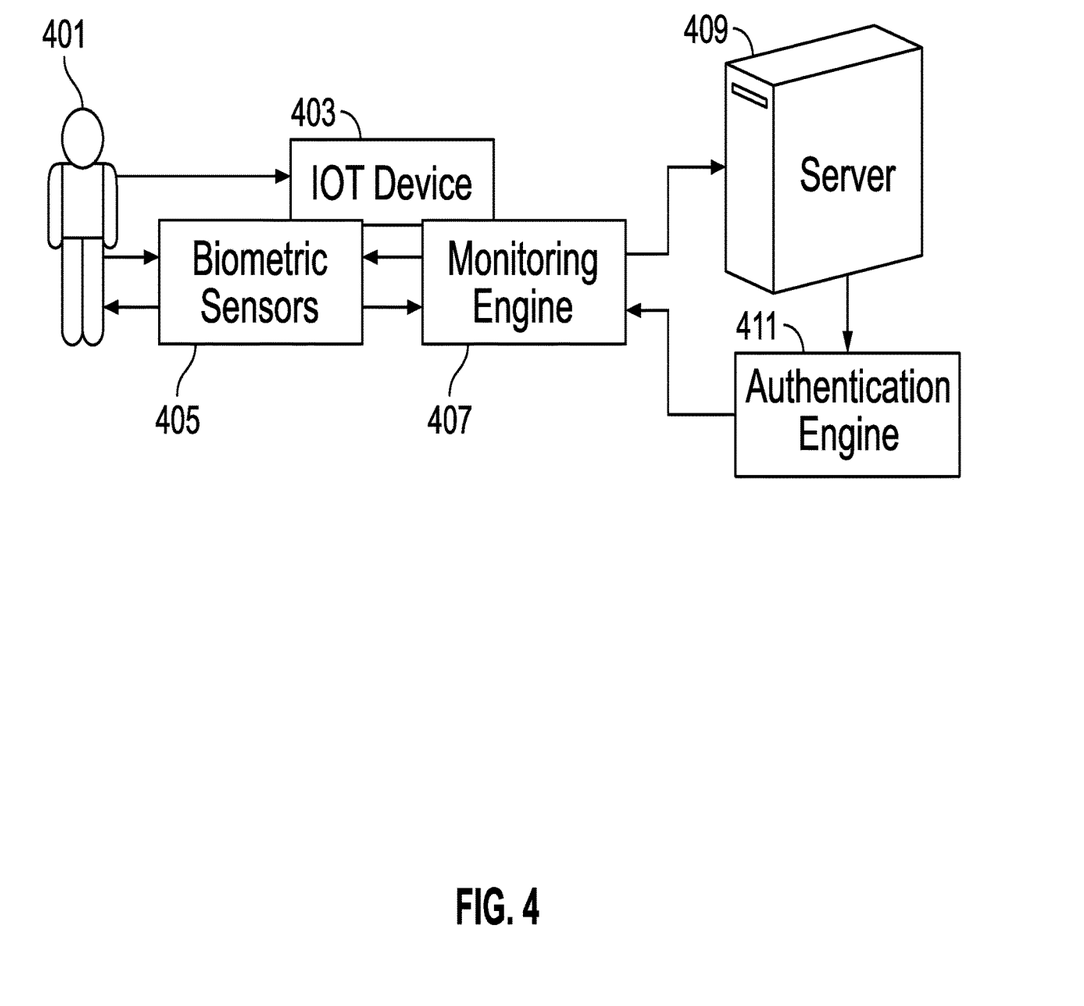
FIG. 4 shows an illustrative diagram in accordance with principles of the disclosure.

FIG. 4 shows an illustrative diagram in accordance with principles of the disclosure. A user 401 may interact with an IoT device 403. The IoT device 403 may include biometric sensors 405 and a monitoring engine 407. The user 401's interactions may be entirely passive, e.g., walking into range of a biometric sensor 405 on the IoT device 403. The user 401's interactions may be active, such as powering the IoT device 403 on.

The biometric sensors 405 may measure biometric attributes of the user 401 and transmit those measurements to the monitoring engine 407 for analysis or transmission to server 409. Authentication engine 411 may be part of server 409. The measured biometric attributes may be analyzed by the authentication engine 411 and results communicated back to monitoring engine 407. Authentication engine 411 may also communicate directly with IoT device 403 or biometric sensors 405. The monitoring engine 407 or authentication engine 411, or both, may continuously in real-time, or at pre-determined time intervals, measure biometric attributes of the user 401 with the biometric sensors 405, and analyze those measurements in order to keep the user 401 authenticated. The user 401, while authenticated, can instruct the IoT device 403 to perform a transaction. In an embodiment the IoT device 403 will process the transaction. In another embodiment, the authentication engine 411 or another application on server 409 will process the transaction. The transaction may only be processed while the user 401 is authenticated.

Figure 5:
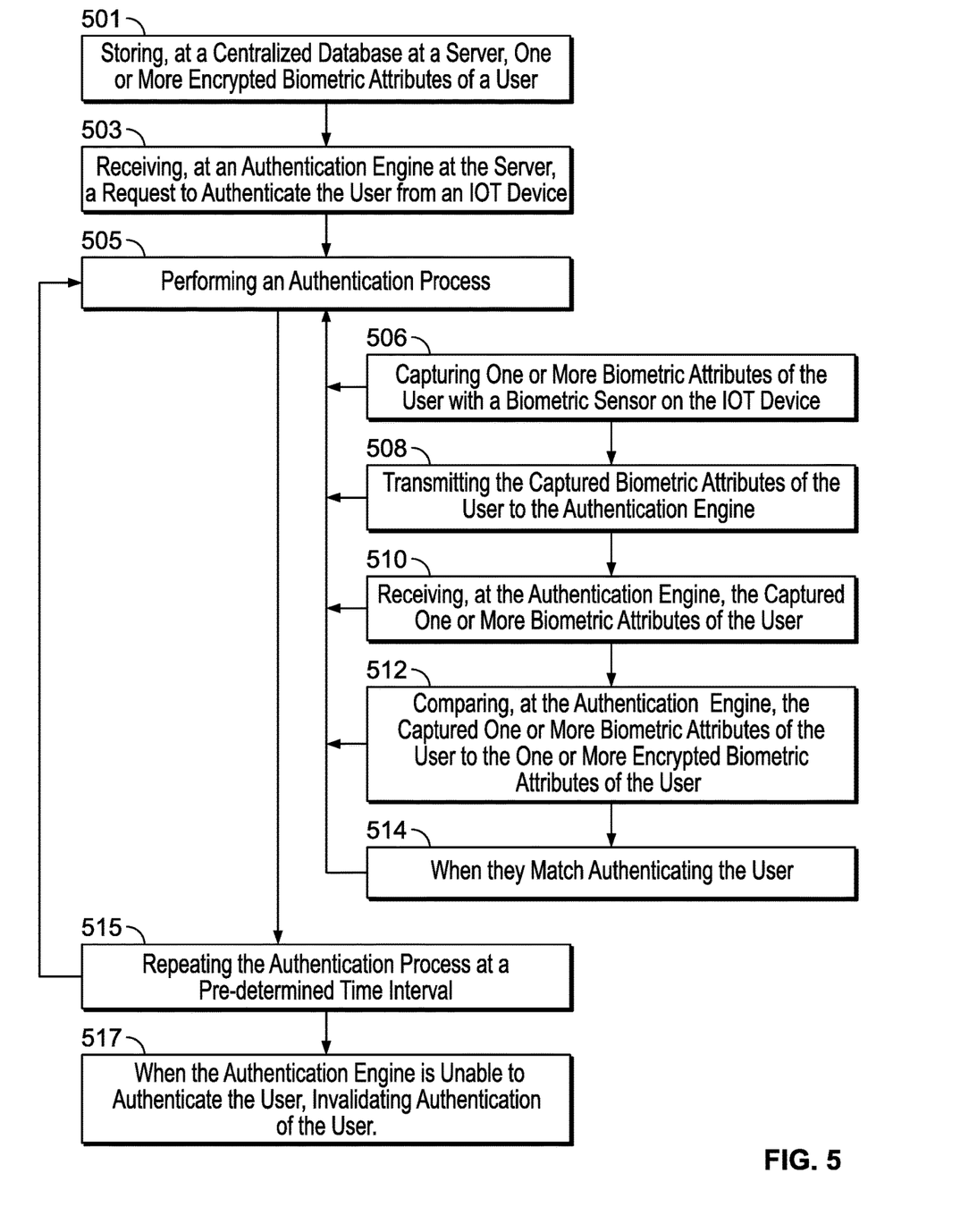
FIG. 5 shows an illustrative flowchart in accordance with principles of the disclosure.

FIG. 5 shows an illustrative flowchart in accordance with principles of the disclosure. Methods may include some or all of the method steps numbered 501 through 517. Methods may include the steps illustrated in FIG. 5 in an order different from the illustrated order. The illustrative method shown in FIG. 5 may include one or more steps performed in other figures or described herein. Steps 501 through 517 may be performed on the apparatus shown in FIGS. 1-4, or other apparatus.

At step 501, one or more encrypted attributes of a user may be stored at a centralized database on a server. At step 503, an authentication engine on the server may receive a request to authenticate the user from an IoT device. At step 505, the authentication engine may perform an authentication process.

The authentication process may include steps 506, 508, 510, 512, and 514, along with other steps. At step 506, the authentication process may capture one or more biometric attributes of the user with one or more biometric sensors on the IoT device. In an embodiment, multiple IoT devices each with one or more biometric sensor may be used. At step 508, the IoT device may transmit the captured/measured biometric attributes of the user to the authentication engine. At step 510, the authentication engine may receive the captured biometric attributes of the user. At step 512, the authentication engine may compare the captured/measured biometric attributes to the encrypted biometric attributes stored at step 501. At step 514, if the measured biometric attributes match the stored encrypted biometric attributes to a pre-determined level of confidence (e.g., more likely than not, or 75%, or 90%, or 99%), the authentication process may authenticate the user.

At step 515, the authentication process (i.e., steps 506-514) is repeated at a pre-determined time interval, e.g., every minute or every second. In an embodiment, the authentication process may be repeated constantly and continuously, in real-time, as long as the user is in range of the biometric sensor(s) of the IoT device. In an embodiment, the repetition may continue until the user can no longer be authenticated and the authentication is invalidated, at step 517. In an embodiment, step 517 may be a part of the authentication process at step 505. In an embodiment, the repetition of step 505 may continue until the user(s) removes themselves from the range of the biometric sensors on the IoT device. In an embodiment, step 505 may be repeated until the user or an administrator ends the authentication process (e.g., by 'logging out').

The authentication process or method may include further steps (not shown), such as receiving a transaction instruction from the user, processing the transaction, and informing the user of the success or failure of the transaction.

Thus, apparatus and for continuous, constant, real-time authentication are provided. Persons skilled in the art will appreciate that the present invention can be practiced by other than the described embodiments, which are presented for purposes of illustration rather than of limitation.

What is claimed is:

1. An apparatus for continuous real-time authentication using Internet-of-things ("IoT") devices, the apparatus comprising:
   one or more IoT devices, each IoT device comprising:
      a communication link;
      a processor;

one or more biometric sensors;
a non-transitory memory configured to store at least:
an IoT operating system; and
a monitoring engine that runs on the processor and is configured to:
measure, at pre-determined time intervals, one or more biometric attributes of a first user with the one or more biometric sensors;
transmit a first measured biometric attribute of the first user to a server;
receive authentication confirmation from the server;
wait for a transaction instruction from the first user;
transmit the transaction instruction to the server along with the authentication confirmation;
receive confirmation that the transaction was completed;
inform the first user that the transaction was completed;
determine, when the first measured biometric attribute changes to a second measured biometric attribute, that the second measured biometric attribute belongs to a second user;
receive a transaction instruction from the second user; and
ignore the transaction instruction from the second user until the second user is authenticated by the server;
the server, the server comprising:
a communication link;
a processor;
a non-transitory memory configured to store at least:
a server operating system;
authentication data of the first user; and
an authentication engine that runs on the processor and is configured to:
receive the first measured biometric attribute from the IoT devices;
store the first measured biometric attribute;
compare the first measured biometric attribute to the authentication data of the first user;
authenticate the first user;
send the authentication confirmation to the IoT devices; and
process the transaction instruction from the first user; and
wherein:
the monitoring engine determines the second measured biometric attribute belongs to the second user by comparing it with the first measured biometric attribute.

2. The apparatus of claim 1 wherein the monitoring engine determines the second measured biometric attribute belongs to the second user by comparing it with the first measured biometric attribute through an artificial intelligence/machine learning ("AI/ML") algorithm.

3. The apparatus of claim 1 wherein one of the one or more biometric sensors is a camera for facial recognition.

4. The apparatus of claim 1 wherein one of the one or more biometric sensors is a microphone for voice recognition.

5. The apparatus of claim 1 wherein one of the one or more biometric sensors is a camera for gait recognition.

6. The apparatus of claim 1 wherein one of the one or more biometric sensors is a camera configured to scan one or more physical characteristics of each user.

7. The apparatus of claim 1 wherein the server is centralized.

8. The apparatus of claim 1 wherein the server is distributed.

9. The apparatus of claim 1 wherein the pre-determined time interval is variable.

10. The apparatus of claim 1 wherein the pre-determined time interval is one second.

11. An apparatus for continuous real-time authentication using Internet-of-things ("IoT") devices, the apparatus comprising:
one or more IoT devices, each IoT device comprising:
a communication link;
a processor;
one or more biometric sensors;
a non-transitory memory configured to store at least:
a device operating system; and
a monitoring engine that runs on the processor and is configured to:
measure one or more biometric attributes of a first user with the one or more biometric sensors at a pre-determined time interval;
transmit the measured biometric attributes of the first user to a server;
wait for a transaction instruction from the first user;
transmit the transaction instruction to the server;
receive confirmation that the transaction was completed;
inform the first user that the transaction was completed;
the server, the server comprising:
a communication link;
a processor;
a non-transitory memory configured to store at least:
a server operating system;
authentication data of the first user; and
an authentication engine that runs on the processor and is configured to:
receive the measured biometric attributes from the IoT devices;
store the measured biometric attributes;
compare the measured biometric attributes to the authentication data of the first user;
authenticate the first user;
receive the transaction instructions;
process the transaction instructions;
transmit a confirmation of a completed transaction to the IoT devices;
determine when the measured biometric attributes indicate that the first user is a second user; and
when the measured biometric attributes indicate that the first user is the second user:
attempt to authenticate the second user; and
ignore any transaction instruction from the second user until the second user is authenticated;
wherein:
the authentication engine determines the first user is the second user by comparing the measured biometric attributes with the authentication data of the first user.

12. The apparatus of claim 11 wherein the authentication engine determines the first user is the second user by comparing the measured biometric attributes with the authentication data of the first user with an artificial intelligence/machine learning ("AI/ML") algorithm.

13. The apparatus of claim 11 wherein the pre-determined time interval is one minute.

14. The apparatus of claim 11 wherein the pre-determined time interval is variable.

15. The apparatus of claim 14 wherein the authentication engine varies the pre-determined time interval through an artificial intelligence/machine learning ("AI/ML") algorithm.

16. A method for continuous real-time authentication using Internet-of-things ("IoT") devices, the method comprising:

storing, at a centralized database at a server, one or more encrypted biometric attributes of a user;

receiving, at an authentication engine at the server, a request to authenticate the user from an IoT device;

performing an authentication process, the authentication process comprising:

capturing, by one or more biometric sensors on the IoT device, one or more biometric attributes of the user;

transmitting the captured one or more biometric attributes of the user to the authentication engine;

receiving, at the authentication engine, the captured one or more biometric attributes of the user;

comparing, at the authentication engine, the captured one or more biometric attributes of the user to the one or more encrypted biometric attributes of the user;

authenticating the user;

repeating the authentication process at a pre-determined time interval; and when the authentication engine is unable to authenticate the user, invalidating authentication of the user.

17. The method of claim 16 wherein the pre-determined time interval is between one millisecond and 120 seconds.

18. The method of claim 16 wherein the pre-determined time interval is variable.

19. The method of claim 18 wherein the pre-determined time interval is variable by an artificial intelligence/machine learning ("AI/ML") algorithm.

20. The method claim 16 further comprising:

monitoring, at the IoT device, the user;

receiving, at the IoT device, one or more transaction instructions from the user;

transmitting, from the IoT device, the transaction instructions to the server;

processing the transaction instructions as long as the authentication process has been completed successfully during the pre-determined time interval; and informing the IoT device when the transaction instructions are processed.

* * * * *